Feb. 23, 1932. B. N. WALLIS 1,846,772
FRAME STRUCTURE
Filed Aug. 11, 1930 4 Sheets-Sheet 3

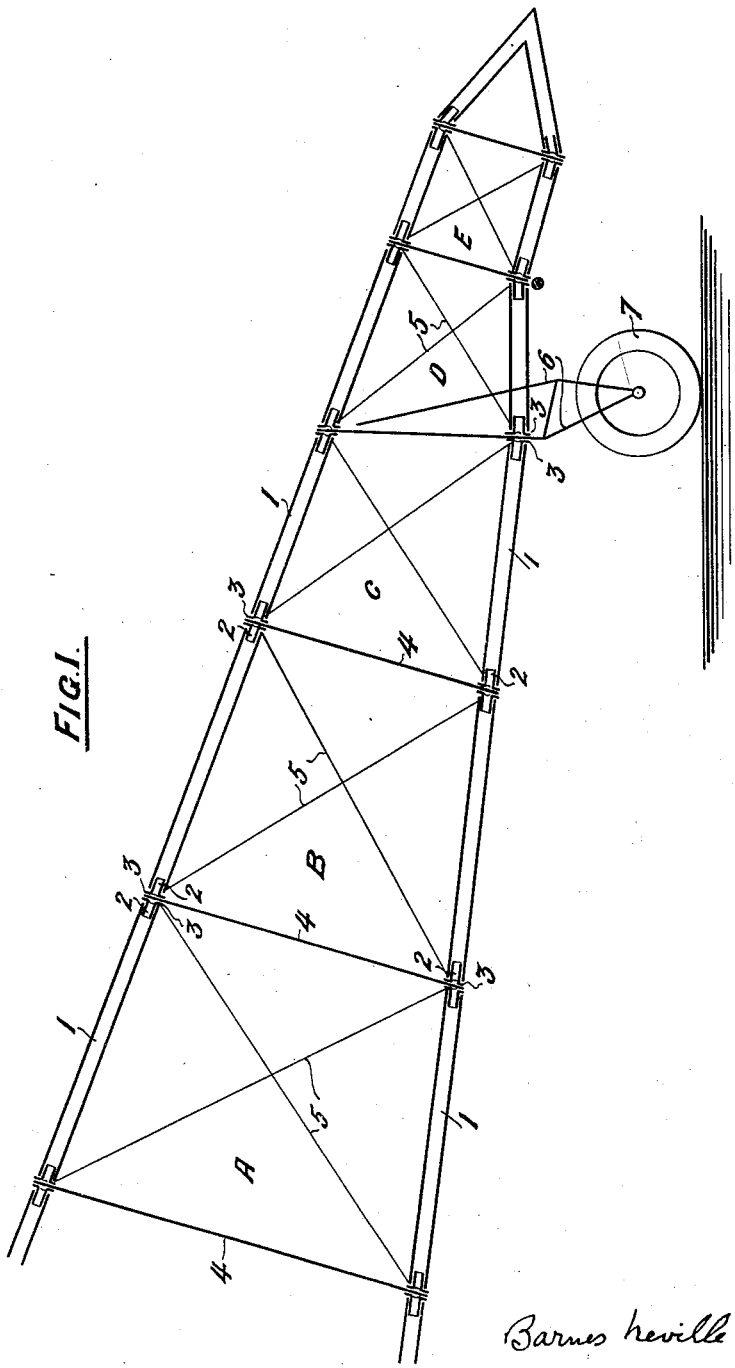

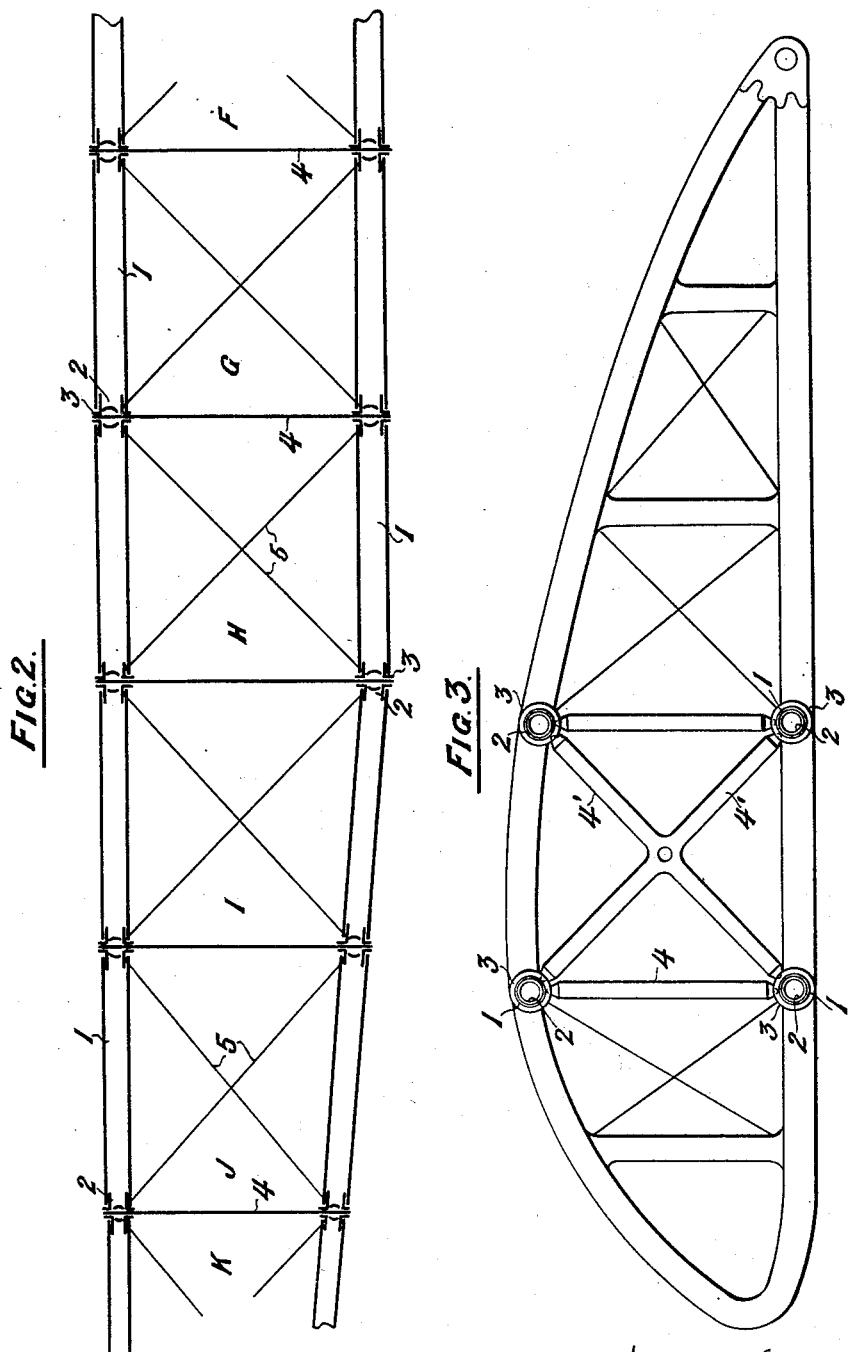

Feb. 23, 1932. B. N. WALLIS 1,846,772
FRAME STRUCTURE
Filed Aug. 11, 1930 4 Sheets-Sheet 4
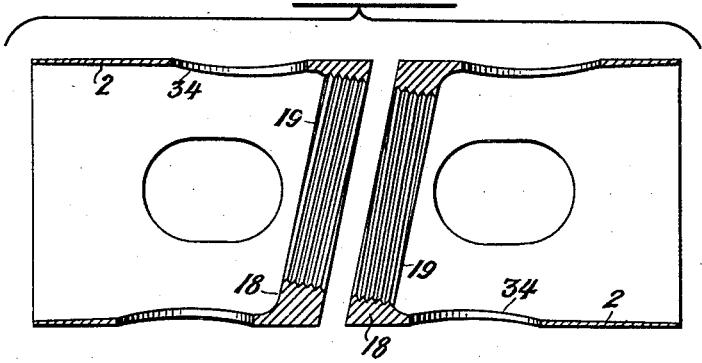
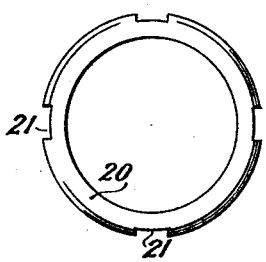
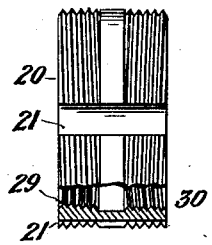
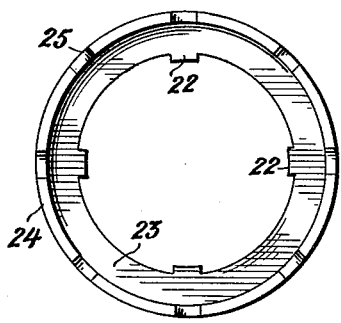
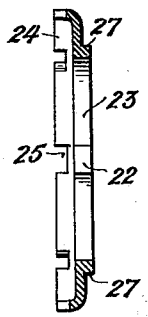
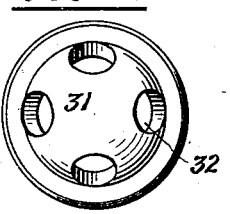

Patented Feb. 23, 1932

1,846,772

UNITED STATES PATENT OFFICE

BARNES NEVILLE WALLIS, OF WEYBRIDGE, ENGLAND

FRAME STRUCTURE

Application filed August 11, 1930, Serial No. 474,492, and in Great Britain September 26, 1929.

This invention relates to frame structures particularly suitable for use in the fuselages and wings of aircraft and in which tubular or other hollow type members, (hereinafter referred to as tubular members) arranged in bays are employed which are too thin in gauge to permit of the ordinary attachment of the end of one tubular member to the end of another tubular member without the ends of such tubular members being strengthened by sleeves, which distribute stresses from the tubular members in one bay to the tubular members in the continuing bay.

In such structures it is particularly desirable to be able to locate the tubular members in one framing member in continuous alignment but at different angles relatively to the tubular members in other framing members so as to produce a tapered structure and also to be able to arrange the tubular members in one bay at a change of angle from continuous alignment up to say thirty degrees to the tubular members in an adjacent further bay in order to produce an irregular structure in order that the structural profile may be thus shaped to any desired form. Moreover, it is also desirable that the tubular members may be easily interconnected and also connected to other members.

It has been customary in frame structures to attach the end of one tube to the end of another tube, on the one hand, in the case of tubular members at varying angles, by strengthening sleeves terminating in ball and socket or pin joints which have the disadvantage of lack of fixity and continuity, together with excessive weight and costliness, or, on the other hand, in the case of tubular members at unvarying angles, it has been possible to utilize screwed couplings by providing the strengthening sleeves with internal oppositely-directed screw threaded nuts, which on being turned cause the strengthening sleeves on the light gauge tubes to be drawn together simultaneously, but these screwed couplings have the disadvantage of the fixity of the angular relationship of the tubular members and also the difficulty of connecting these couplings to each other and to other members.

It is also well known that the loads vary considerably in different parts of the fuselages, wings and other similar cantilever structures of aircraft, and that it is desirable for many reasons, but primarily for considerations of weight, that the sizes of the framing parts of such bodies should be kept at a minimum consistent with providing sufficient strength to take the stresses in each part with a suitable factor of safety.

With continuous framing members it is not practicable to grade the tubes themselves in accordance with the change of stress in the different parts, and with tubular members arranged in bays, in which the tubular members in one bay are connected to the tubular members in an adjacent further bay by means of strengthening sleeves, while it may be easy to grade the gauge of the tubular members in accordance with the change in stress, difficulties are introduced, when it is desired to make a tapered structure, by the angular relationship of the tubular members in different sections and, when it is desired to make an irregular cantilever structure by the change in angularity of the tubular members in different bays, because the different angular relationship and the change in angularity make it difficult to interconnect the parts of the frame by lateral members or to connect lateral members thereto.

The purpose of this invention is to provide a frame structure particularly suitable for use in the fuselages and wings of aircraft which are built up with tubular members arranged in bays so as to permit the tubular members to be graded in accordance with the change of load and either arranged with the tubular members in each longitudinal member in continuous alignment but at a different angular position to other longitudinal members, or having the tubes in the different bays at a change of angle from the continuous alignment up to say thirty degrees but also permit of the lateral members being connected to said longitudinal members in the most advantageous position for the purpose of distributing the stresses between the different bays.

According to this invention the frame structure comprises longitudinal members composed of thin tubular members arranged in bays some or all of which are of nonrectangular shape, each tubular member terminating in strengthening sleeves adapted to connect the tubular member in one bay to the continuing tubular member of the adjacent further bay, the strengthening sleeves being formed with terminal flanges, all the opposed flanges at each end of each bay being contained in a single plane transverse to the structure, means for clamping the flanges of the sleeves in one bay to the flanges of the sleeves in the adjacent bay and lateral members having their ends connected to and located in position by the flanges, all arranged in such a manner that the forces in the longitudinal and lateral members are all directed to common points of intersection between the flanges.

In addition to the lateral members, bracing members are connected to the strengthening sleeves diagonally across the structure in such a manner that the loads in such diagonal bracing members are directed to the common points of intersection of the forces in the longitudinal and lateral members.

The invention will now be described with reference to the accompanying drawings in which:—

Fig. 1 is a view illustrating diagrammatically the rear portion of the framework, forming the fuselage for aircraft, and showing the longitudinal framing members composed of tubular members arranged in bays, in some of the different bays the tubular members are disposed in continuous alignment with the tubular members in the other longitudinal framing members and also the tubular members in one bay are disposed at a change of angle to the tubular members in the adjacent bay in order that the structural profile may be of the desired form.

Fig. 2 is a view illustrating diagrammatically a fragment of the spar of a wing for aircraft and showing the longitudinal booms composed of tubular members arranged in bays with the tubular members in one of the bays of the lower booms disposed at a change of angle to the tubular members in the adjacent bay to allow for the reduction in depth due to the tapering of the tips of the wing, and also showing the grading in size of the tubular members with the change of stress.

Fig. 3 is a view illustrating diagrammatically a sectional profile of the wing shown in Fig. 2.

Fig. 6 is a sectional view of the two sleeves shown in Fig. 5 but separated from other parts.

Fig. 7 is an elevation of the ferrule for connecting the sleeves, shown separately.

Fig. 8 is a side view of the ferrule with part broken away to show the internal formation.

Figs. 9 and 10 is an elevation and a sectional side view, respectively, of the key plate for turning the ferrule, both separated from the other parts.

Fig. 11 is an elevation of the cup for the attachment of the diagonal members.

Figure 4:
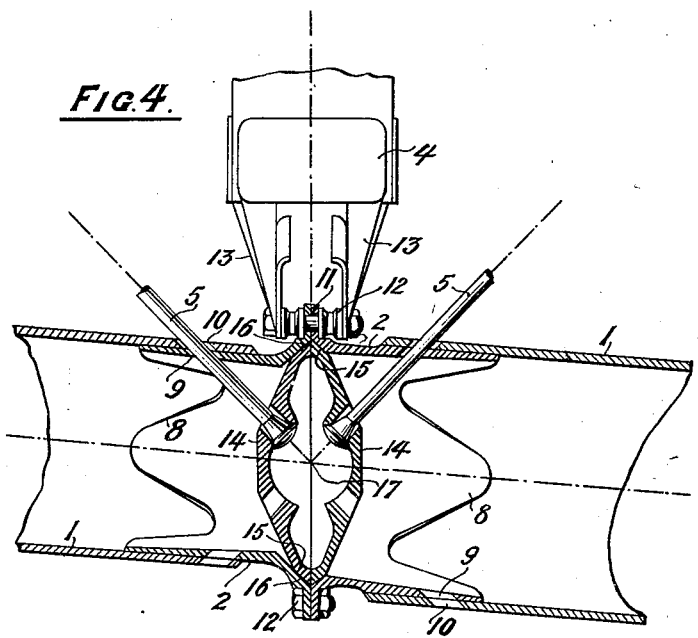
Fig. 4 is a fragmentary sectional view of ends of tubular members in adjacent bays with one form of the strengthening sleeves for connecting these tubes together and to the lateral and diagonal members.
Figure 5:
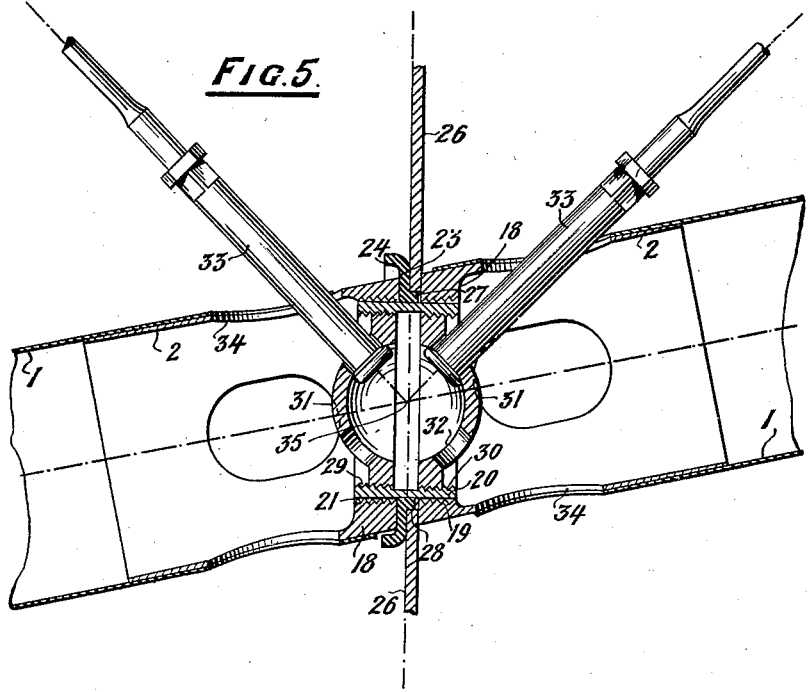
Fig. 5 is a similar view to Fig. 4 but illustrating another form of the strengthening sleeves.

In the embodiment shown in Fig. 1 as applied to a fuselage, the frame is built up of a number of tubular members 1 each of which may, for example, be made in a known manner from a narrow strip of metal bent into a close helix so as to constitute a tube. The tubular member so formed can be readily made of any desired gauge or thickness of metal or size in diameter so that the strength of the tubular member can be graded to suit the forces imposed on the section of the body in which it is located. Each tubular member is provided with a strengthening sleeve 2 at each end by which it can be connected to the tube of an adjacent section. This strengthening sleeve 2 is made with an outwardly directed flange termination 3, the outer surface of which flanges subtends a predetermined angle to the axis of the tube, so that the tubes can extend at any desired angle relatively to each other. The flanges of adjacent tubular members are clamped together.

The tubular members are arranged in bays marked A, B, C, D and E, and each bay may comprise any number of these tubes located at any particular angular relationship according to the design of the structure, but we will consider, for example, a bay built up of four such tubular members disposed two at the top and two at the bottom, with the tubular members at the top and bottom spaced apart transversely. As shown the tubular members at the top of bays A, B, C, D and E are in continuous alignment, while those at the bottom of bays A, B, and C are also in alignment, those at the bottom of bays D and E are at a change of angle to each other and to the tubular members in the next adjacent bay C. In all cases however the tubular members at the top are in angular relationship to those at the bottom, so that all the bays are non-rectangular. In such an arrangement and by using strengthening sleeves with flange terminations as hereinbefore described, the flange terminations 3 of the sleeves in the four tubes at the end of each bay can be so arranged that they are in the same transverse plane, and are also in the same plane as the opposed flange terminations of the sleeves in the tubes in the next adjacent bay. Members for staying the junctions of the tubular members apart may thus be clamped between the flange terminations. These members which may comprise upright members marked 4 and diagonal members marked 4' (Fig. 3) both of which extend laterally of the tubes and are consequently herein termed "lateral members".

The structure may be braced by providing bracing members 5 which extend diagonally across and are fixed to the sleeves.

The lateral members may also be used for the connection of other framing members, for instance, a lateral member between bays C and D is provided with a downwardly extending frame 6 carrying a tail wheel 7 of the aircraft.

In the embodiment shown in Figs. 2 and 3, as applied to a spar for wings of aircraft, the spar is built up in the same way as the frame in Fig. 1 by means of tubular members, strengthening sleeves, lateral members and diagonal members, marked with the same references as Fig. 1, and arranged in bays marked F, G, H, I, J, and K. In this case, however, the tubular members at the top of the bays F, G, and H are in continuous alignment as are also the tubular members at the bottom of these bays, and, moreover, the tubular members at the top are parallel to the tubular members at the bottom of the bays. The tubular members at the top of the bays I, J and K are also in alignment with the tubular members at the top of bays F, G and H, but the tubular members at the bottom of these bays I, J and K, although disposed with each tubular member in continuous alignment with one in the next adjacent bay, are at a change of angle relatively to the tubular members at the bottom of the bays F, G and H. Thus, although the bays F, G and H are rectangular the bays I, J and K are non-rectangular in shape. Moreover, the tubular members in the bays I and J are smaller in diameter than the tubular members in the bays F, G and H and the tubular members in the bay K are also smaller than the tubular members in the bays I and J.

In Fig. 4 is shown by way of example one form of the sleeves. In this case the strengthening sleeve which is itself marked 2, to agree with Figs. 1 to 3 of the drawings, is formed with cylindrical finger portions 8 which fit within the end of the tubular members and are fixed by rivets or otherwise thereto. These sleeves are also formed with holes 9 coincident with holes 10 in the tubes for the passage of the diagonal members 5. The flange termination 3 is, in this case, outwardly directed and may be of square, circular or polygonal shape, having holes 11 at right angles to the flanges for the reception of bolts and nuts, collectively marked 12, by which the opposed flange terminations of adjacent tubular members are clamped together. The flange terminations of the sleeves are clamped directly face to face and the lateral members 4 are provided with bifurcated end portions 13 which are clamped to the flanges by one of the nuts and bolts 12 which clamp the flange terminations to each other.

The bracing members 5 are attached to the sleeves by means of the internal cups 14 formed with coned external surfaces 15 adapted to bear on the coned internal surfaces 16 in the flanges.

By connecting the tubular members, lateral members and diagonal bracing members in this manner the geometrical axes of these parts, indicated by a chain-dotted line, intersect each other at a common point marked 17 between the flanges so that the forces in these members are all directed to this common point.

In the modified construction of the strengthening sleeves shown in Figs. 5 to 11, the sleeves, which are again marked 2, are formed with inwardly directed flange terminations 18 having holes internally screw-threaded at 19 to engage with an externally screw threaded ferrule 20. The screw threads 19 in opposed flange terminations of the sleeves of the tube in one bay, and of the sleeve of the tube in an adjacent bay, are oppositely directed and the external screw threads on the opposite ends of the ferrule are also oppositely directed so as to permit the ferrule to engage with the flanged terminations of the sleeves simultaneously and by rotation of the ferrule to draw the tubes equally together. The ferrule is provided externally with axial grooves 21 extending from end to end for the reception of the internal projections 22 of a key plate 23 adapted to be slid in an axial direction over the ferrule in order that the ferrule may be rotated by this key plate. The key plate is provided with a flanged part 24 extending outwardly of the sleeve and formed with slots 25 for the reception of a key. In this case, a bearing plate 26 is provided adapted to fit around and free to turn on the ferrule and adapted to be clamped between the flange terminations 18, with the key plate, for the connection of the lateral members to the sleeves. In order to increase the size of the internal projections 22 on the key plate, while maintaining the total width of the key plate and bearing plate at a minimum, this key plate is formed with an axially extending flange 27 which fits in a hole 28 in the bearing plate 26, the flange 27 being slightly shorter in length than the width of the plate 26, in order that the plate 26 may be clamped by the flange terminations.

The ferrule is also provided with oppositely directed internal screw threads 29 and 30 for the reception of cup members 31 having holes 32 for the reception of diagonal bracing members 33 passing through holes 34 in the sleeves 2.

The screw threads 19 in the sleeves are normal to the inwardly directed flange terminations 18. The geometrical axes of the tubular members, the lateral members, and the diagonal bracing members, indicated by chain-dotted lines, are again all directed to a common point of intersection 35 between the flanges.

In the construction shown in Figs. 5 to 11, the flange terminations 18 may be provided with outwardly directed flanges in addition to the inwardly directed flanges. Moreover, the lateral members might be connected to the key plate itself in which case the bearing plate 26 would be dispensed with and the key plate correspondingly modified.

The bearing plates where provided, or the lateral members may be used for the connection of other framing members, for instance, for the connection of framing members supporting a petrol tank or an engine or any other part of the aircraft, and said internal cups may be used for the attachment of bracing members for staying the external framing members supporting the tank or engine or other part of the aircraft.

What I claim as my invention and desire to secure by Letters Patent is:—

1. Frame structures, comprising, longitudinal members composed of thin tubular members arranged in bays, some of which bays are of non-rectangular shape, strengthening sleeves at the ends of each tubular member adapted to connect the tubular member in one bay to the continuing tubular member of the adjacent further bay, said strengthening sleeves being formed with apertures and with terminal flanges, all the opposed terminal flanges at each end of each bay being contained in a single plane transverse to the structure, means for clamping the opposed flanges of the sleeves in one bay to the terminal flanges of the sleeves in the adjacent bay, lateral members having their ends connected to and located in position by the terminal flanges, cups seated within the terminal flanges of the sleeves, and bracing members supported at its ends in said cups and passing through the apertures in the strengthening sleeves and diagonally across the structure, all arranged in such a manner that the forces in the longitudinal members, lateral members and bracing members are all directed to common points of intersection between the terminal flanges.

2. Frame structures, comprising, longitudinal members composed of thin tubular members arranged in bays, some of which bays are of non-rectangular shape, strengthening sleeves at the ends of each tubular member adapted to connect the tubular member in one bay to the continuing tubular member of the adjacent further bay, said strengthening sleeves being formed with terminal flanges with internal oppositively directed screw threads in said terminal flanges, all the opposed terminal flanges at each end of each bay being contained in a single plane transverse to the structure, a clamping ferrule formed with exterior, oppositively directed screw threads adapted to engage in the internal screw threads in the terminal flanges for clamping the opposed terminal flanges of the sleeves in one bay to the terminal flanges of the sleeves in the adjacent bay, a key adapted to turn the clamping ferrule and lateral members having their ends connected to and located in position by the terminal flanges all arranged in such a manner that the forces in the longitudinal and lateral members are all directed to common points of intersection between the flanges.

3. Frame structures, comprising, longitudinal members composed of thin tubular members arranged in bays, some of which bays are of non-rectangular shape, strengthenings sleeves at the ends of each tubular member adapted to connect the tubular member in one bay to the continuing tubular member of the adjacent further bay, said strengthening sleeves being formed with terminal flanges and with internal, oppositively directed screw threads in said terminal flanges, all the opposed terminal flanges at each end of each bay being contained in a single plane transverse to the structure, a clamping ferrule formed with exterior, oppositively directed screw threads adapted to engage in the internal screw threads in the terminal flanges for clamping the opposed terminal flanges of the sleeves in one bay to the terminal flanges of the sleeves in the adjacent bay, a key adapted to turn the clamping ferrule, a laterally extending plate free to turn on the ferrule and adapted to be clamped between the terminal flanges and lateral members having their ends connected to and located in position by the laterally extending plate, all arranged in such a manner that the forces in the longitudinal and lateral members are all directed to common points of intersection between the terminal flanges.

4. Frame structures, comprising, longitudinal members composed of thin tubular members arranged in bays, some of which bays are of non-rectangular shape, strengthening sleeves at the ends of each tubular member adapted to connect the tubular member in one bay to the continuing tubular member of the adjacent further bay, said strengthening sleeves being formed with terminal flanges and with internal, oppositively directed screw threads in said terminal flanges, all the opposed terminal flanges at each end of each bay being contained in a single plane transverse to the structure, a clamping ferrule formed with exterior, oppositively directed screw threads adapted to engage in the internal screw threads in the terminal flanges for clamping the opposed terminal flanges of the sleeves in one bay to the terminal flanges of the sleeves in the adjacent bay, and formed with internal, oppositively directed screw threads, cups formed with external screw threads adapted to engage in the internal screw threads in the clamping ferrule, lateral members having their ends connected to and located in position by the terminal flanges, bracing members supported at their ends in said cups and passing through the apertures in the strengthening sleeves and diagonally across the structure, all arranged in such a manner that the forces in the longitudinal members, lateral members and bracing members are all directed to common points of intersection between the terminal flanges.

5. Frame structures, comprising, longitudinal members composed of thin tubular members arranged in bays, some of which bays are of non-rectangular shape, strengthening sleeves at the ends of each tubular member adapted to connect the tubular member in one bay to the continuing tubular member of the adjacent further bay, said strengthening sleeves being formed with terminal flanges and with internal oppositively directed screw threads in said terminal flanges, all the opposed terminal flanges at each end of each bay being contained in a single plane transverse to the structure, a clamping ferrule formed with exterior oppositively directed screw threads adapted to engage in the internal screw threads in the terminal flanges for clamping the opposed terminal flanges of the sleeves in one bay to the terminal flanges of the sleeves in the adjacent bay and formed with exterior, axially arranged grooves, a key adapted to turn the clamping ferrule having a flanged internal part formed with teeth to engage in said axially arranged grooves, a laterally extending plate free to turn on the flanged internal part of the key and adapted to be clamped between the terminal flanges and lateral members having their ends connected to and located in position by the laterally extending plate, all arranged in such a manner that the forces in the longitudinal and lateral members are all directed to common points of intersection between the terminal flanges.

In witness whereof I have hereunto set my hand.

BARNES NEVILLE WALLIS.